Patented Nov. 16, 1937

2,099,272

UNITED STATES PATENT OFFICE 2,099,272

WATER-INSOLUBLE AZODYESTUFFS AND FIBER DYED THEREWITH

Heinrich Morschel, Leverkusen-Wiesdorf, and Felix Gund, Cologne-Deutz, Germany, assignors to General Aniline Works, Inc., New York, N. Y., a corporation of Delaware No Drawing. Application November 7, 1935, Serial No. 48,776. In Germany November 14, 1934

12 Claims. (Cl. 260—83)

The present invention relates to new water-insoluble azodyestuffs, more particularly it relates to azodyestuffs which may be represented by the following general formula:

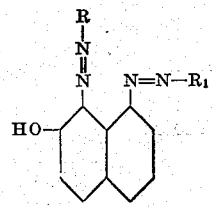

wherein R stands for an aromatic radical free from groups inducing solubility in water, such as a benzene or naphthalene nucleus, which may bear suitable substituents, such as alkyl, alkoxy, halogen, the nitro group, the trifluoromethyl group, and $R_1$ stands for the radical of an arylamide, of a $\beta$-ketocarboxylic acid or of an arylamide of an o-hydroxycarboxylic acid, which has been coupled in o-position to the hydroxy group.

Our new dyestuffs are obtainable by diazotizing an aminoazo compound of the general formula:

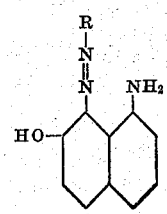

wherein R means the same as stated above, and coupling in substance or on a substratum, especially the vegetable fiber, with an arylamide of a $\beta$-ketocarboxylic acid or of an o-hydroxycarboxylic acid coupling in o-position to the hydroxy group. Depending upon the specific coupling components used there are obtained various shades of good fastness properties.

The aminoazo compounds used as diazotization components in the manufacture of our new dyestuffs are obtainable for example by coupling in an alkaline medium a 7-hydroxy-1-acylaminonaphthalene which may be represented by the following formula:

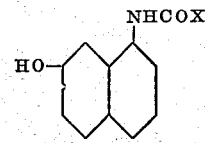

wherein X means alkoxy or aryloxy, the amino group, in which one or both hydrogen atoms may be substituted by aliphatic or aromatic radicals, a hydrogen atom, alkyl, aralkyl, aryl or hydroaryl, with a diazo compound free from groups inducing solubility in water, and splitting off the acyl group in the 1-position according to methods known per se. This method of preparing the diazotization components is of especial value for the manufacture of those aminoazo compounds of the above identified type, in which the arylazo group in the 8-position is derived from amines of a high energy of coupling, i. e. of strongly negative substituted amines, such as arylamines substituted by a nitro group or by at least two halogen atoms. For, if there is coupled in an alkaline medium 7-hydroxy-1-aminonaphthalene with a diazo compound of such an amine of high energy of coupling, besides 8-arylazo compounds there are obtained other coupling products in considerable quantities. In contradistinction thereto according to the process as described above there are obtained in smooth reaction and in a uniform manner the corresponding 8-arylazo-7-hydroxy-1-aminonaphthalene.

The invention is illustrated by the following examples, but is not restricted thereto:

Examples 50 grams of cotton yarn are impregnated for half an hour in a bath at 30° C. prepared in the usual manner and containing per litre 3 grams of 2-(2'-hydroxynaphthalene-3'-carbonylamino)-5-chloro-1-methoxybenzene, 8 ccs. of aqueous caustic soda lye of 38° Bé. and 6 ccs. of Turkey red oil. The yarn is squeezed, and the dyeing is developed by introducing the yarn into one litre of a developing bath containing 2.65 grams of diazotized 8-benzeneazo-1-amino-7-hydroxynaphthalene, 1.5 ccs. of glacial acetic acid and 30 grams of common salt. After rinsing, soaping in a boiling bath, again rinsing and drying, there is obtained a deep brown; the dyestuff corresponds probably to the following formula:

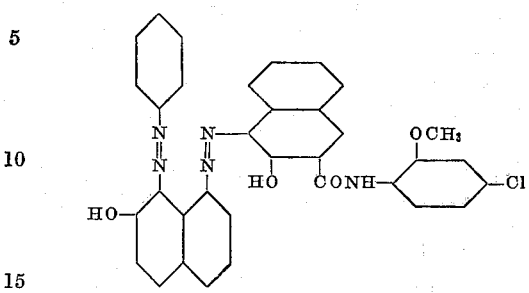

a yellowish blackish brown, the dyestuff corresponding to the following formula:

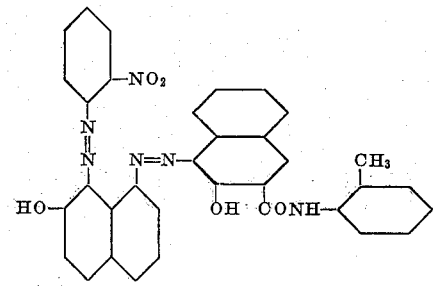

In an analogous manner there is obtained from diazotized:

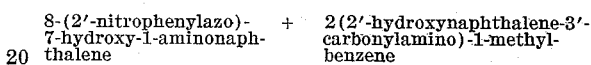

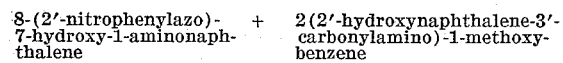

a yellowish blackish brown, the dyestuff corresponding to the following formula:

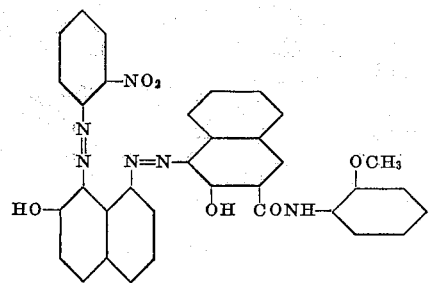

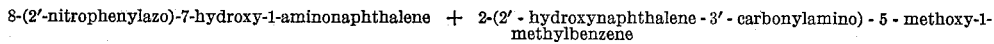

a blackish brown, the dyestuff corresponding to the following formula:

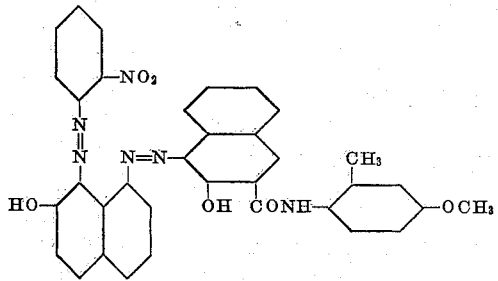

| | | |
|---|---|---|
| 8-phenylazo-7-hydroxy-1-aminonaphthalene | + 1-(2'-hydroxynaphthalene-3'-carbonylamino)-naphthalene | a blackish brown |
| Do. | + 2-(2'-hydroxynaphthalene-3'-carbonylamino)-1-ethoxy-benzene | an olivish dark brown |
| Do. | + terephthaloyl-diacetic-acid-di-(2'-methoxy-4'-chloro-5'-methyl-1'-phenylamide) | a reddish brown |
| Do. | + 1-(1',2'-benzocarbazole-2''-hydroxy-3''-carbonylamino)-4-methoxybenzene | a dark brown |
| Do. | + 3,3'-dimethyl-4,4'-diacetoacetyldiphenyl | a reddish brown |
| 8-(2'-ethoxyphenylazo)-7-hydroxy-1-aminonaphthalene | + 2-(2'-hydroxynaphthalene-3'-carbonylamino)-1-methylbenzene | a dark brown |
| Do. | + 2-(2'-hydroxynaphthalene-3'-carbonylamino)-1,4-dimethoxybenzene | a reddish dark brown |
| 8-(2'-methoxyphenylazo)-7-hydroxy-1-amino-naphthalene | + 2-(2'-hydroxynaphthalene-3'-carbonylamino)-1-methoxybenzene | a reddish dark brown |
| Do. | + 4-(2'-hydroxynaphthalene-3'-carbonylamino)-2-chloro-1-methoxybenzene | a violettish blackish brown |
| 8-(4'-methoxyphenylazo)-7-hydroxy-1-aminonaphthalene | + 2-(2'-hydroxynaphthalene-3'-carbonylamino)-1-methoxybenzene | a reddish dark brown |
| Do. | + 2-(2'-hydroxynaphthalene-3'-carbonylamino)-5-methoxy-1-methylbenzene | a reddish dark brown |
| Do. | + 1-(2'-hydroxycarbazole-3'-carbonylamino)-4-chlorobenzene | a violettish reddish brown |
| 8-(2'-methylphenylazo)-7-hydroxy-1-aminonaphthalene | + 2'-hydroxynaphthalene-3'-carbonylaminobenzene | a reddish dark brown |
| Do. | + 2-(2'-hydroxynaphthalene-3'-carbonylamino)-5-methoxy-1-methylbenzene | a reddish dark brown |
| 8-(4'-methylphenylazo)-7-hydroxy-1-aminonaphthalene | + 2-(2'-hydroxynaphthalene-3'-carbonylamino)-1-methoxybenzene | a reddish brown |
| Do. | + 2-(2'-hydroxynaphthalene-3'-carbonylamino)-1-ethoxybenzene | a brown |
| 8-(3'-chloro-4'-methoxy-phenylazo)-7-hydroxy-1-amino-naphthalene | + 2-(2'-hydroxynaphthalene-3'-carbonylamino)-1-methoxy-5-chlorobenzene | a reddish brown |
| Do. | + 2-(2'-hydroxynaphthalene-3'-carbonylamino)-1-methyl-5-chlorobenzene | a reddish brown |
| 8-(2'-chlorophenylazo)-7-hydroxy-1-aminonaphthalene | + 1-(2'-hydroxynaphthalene-3'-carbonylamino)-naphthalene | a dull reddish brown |
| Do. | + 2-(2'-hydroxynaphthalene-3'-carbonylamino)-1-methoxybenzene | a yellowish brown |

| | | |
|---|---|---|
| 8-(3'-chlorophenylazo)-7-hydroxy-1-aminonaphthalene | + 2-(2'-hydroxynaphthalene-3'-carbonylamino)-naphthalene | a reddish dark brown |
| Do. | + 4-(2'-hydroxynaphthalene-3'-carbonylamino)-2-chloro-1-methoxybenzene | a reddish dark brown |
| 8-(2'-chloro-6'-methyl-phenylazo)-7-hydroxy-1-aminonaphthalene | + 2-(2'-hydroxynaphthalene-3'-carbonylamino)-naphthalene | a violettish dark brown |
| Do. | + 2-(2'-hydroxynaphthalene-3'-carbonylamino)-5-methoxy-1-methylbenzene | a violettish dark brown |
| 8-(3'-chloro-6'-methoxyphenylazo)-7-hydroxy-1-aminonaphthalene | + 2-(2'-hydroxynaphthalene-3'-carbonylamino)-5-methoxy-1-methylbenzene | a yellowish dark brown |
| Do. | + 2-(2'-hydroxynaphthalene-3'-carbonylamino)-naphthalene | a reddish dark brown |
| 8-(4'-chlorophenylazo)-7-hydroxy-1-aminonaphthalene | + 2-(2'-hydroxynaphthalene-3'-carbonylamino)-1-methylbenzene | a reddish brown |
| Do. | + 2-(2'-hydroxynaphthalene-3'-carbonylamino)-5-chloro-1-methoxybenzene | a reddish brown |
| 8-(2',4-dimethylphenylazo)-7-hydroxy-1-aminonaphthalene | + 2-(2'-hydroxynaphthalene-3'-carbonylamino)-5-chloro-1-methoxybenzene | a dark brown |
| Do. | + 2-(2'-hydroxynaphthalene-3'-carbonylamino)-naphthalene | a violettish dark brown |
| 8-(2'-nitrophenylazo)-7-hydroxy-1-aminonaphthalene | + 2-(2'hydroxynaphthalene-3'-carbonylamino)-naphthalene | a reddish blackish brown |
| 8-(3'-nitrophenylazo)-7-hydroxy-1-aminonaphthalene | + 1-(2'-hydroxynaphthalene-3'-carbonylamino)-3-nitrobenzene | a brown |
| Do. | + 2-(2'-hydroxynaphthalene-3'-carbonylamino)-5-chloro-1-methylbenzene | a reddish dark brown |
| 8-(2'-nitro-4'-methylphenylazo)-7-hydroxy-1-aminonaphthalene | + 2-(2'-hydroxynaphthalene-3'-carbonylamino)-1-methylbenzene | a dark brown |
| Do. | + 2-(2'-hydroxynaphthalene-3'-carbonylamino)-1-methoxybenzene | a reddish dark brown |
| 8-(3'-nitro-4,6-dimethylphenylazo)-7-hydroxy-1-aminonaphthalene | + 2-(2'-hydroxynaphthalene-3'-carbonylamino)-1-ethoxybenzene | a brown |
| Do. | + 2-(2'-hydroxynaphthalene-3'-carbonylamino)-1,4-dimethoxybenzene | a reddish brown |
| 8-(3'-nitro-4-methylphenylazo)-7-hydroxy-1-aminonaphthalene | + 1-(2'-hydroxynaphthalene-3'-carbonylamino)-naphthalene | a reddish brown |
| Do. | + 2-(2'-hydroxynaphthalene-3'-carbonylamino)-1-methoxybenzene | a brown |
| 8-(2'-methoxy-4'-nitrophenylazo)-7-hydroxy-1-aminonaphthalene | + 2-(2'-hydroxynaphthalene-3'-carbonylamino)-5-ethoxy-1-methylbenzene | a reddish brown |
| Do. | + 2-(2'-hydroxynaphthalene-3'-carbonylamino)-1,4-dimethoxybenzene | a reddish dark brown |
| 8-(3'-nitro-6'-methylphenylazo)-7-hydroxy-1-aminonaphthalene | + 2-(2'-hydroxynaphthalene-3'-carbonylamino)-naphthalene | a reddish dark brown |
| Do. | + 2-('-hydroxynaphthalene-3'-carbonylamino)-1-methoxybenzene | a dark brown |
| 8-(3'-nitro-6'-ethoxyphenylazo)-7-hydroxy-1-aminonaphthalene | + 2-(2'-hydroxynaphthalene-3'-carbonylamino)-1-methylbenzene | a reddish brown |
| 8-(3'-nitro-4'-ethoxyphenylazo)-7-hydroxy-1-aminonaphthalene | + 2-(2'-hydroxynaphthalene-3'-carbonylamino)-1-methylbenzene | a reddish brown |
| 8-(2'-nitro-4'-methoxyphenylazo)-7-hydroxy-1-aminonaphthalene | + 4-(2'-hydroxynaphthalene-3'-carbonylamino)-1,3-dimethylbenzene | a violettish dark brown |
| Do. | + 2-(2'-hydroxynaphthalene-3'-carbonylamino)-4-chloro-1-methoxybenzene | a blackish brown |
| 8-(2'-nitro-4',6'-dimethylphenylazo)-7-hydroxy-1-aminonaphthalene | + 2-(2'-hydroxynaphthalene-3'-carbonylamino)-5-methoxy-1-methylbenzene | a reddish blackish brown |
| 8-(naphthyl-1'-azo)-7-hydroxy-1-aminonaphthalene | + 2-(2'-hydroxynaphthalene-3'-carbonylamino)-1-methylbenzene | a reddish brown |
| Do. | + 2-(2'-hydroxynaphthalene-3'-carbonylamino)-1-methoxybenzene | a reddish dark brown |
| Do. | + 2-(2'-hydroxynaphthalene-3'-carbonylamino)-5-methoxy-1-methylbenzene | a reddish-violettish dark brown |
| 8-benzeneazo-1-amino-7-hydroxy-naphthalene | + 1-(2'-hydroxynaphthalene-3'-carbonylamino)-naphthalene | a reddish dark brown |
| Do. | + 2-(2'-hydroxynaphthalene-3'-carbonylamino)-1-ethoxybenzene | a yellowish dark brown |
| Do. | + 3,3'-dimethyl-4,4'-diacetoacetylaminodiphenyl | an orange brown |
| 8-(2'-methyl-4'-nitrobenzeneazo)-1-amino-7-hydroxynaphthalene | + 2-(2'-hydroxynaphthalene-3'-carbonylamino)-1,4-dimethoxybenzene | a yellowish dark brown |
| Do. | + 1-(2'-hydroxynaphthalene-3'-carbonylamino)-naphthalene | a brown |
| Do. | + 2-(2'-hydroxynaphthalene-3'-carbonylamino)-5-chloro-1-methylbenzene | a brown |
| 8-(3'-chloro-4'-methoxybenzeneazo)-1-amino-7-hydroxynaphthalene | + 2'-hydroxynaphthalene-3'-carbonylaminobenzene | a reddish dark brown |
| 8-(2'-chlorobenzeneazo)-1-amino-7-hydroxynaphthalene | + Do. | a reddish brown |

We claim:
1. Waterinsoluble azodyestuffs of the general formula:

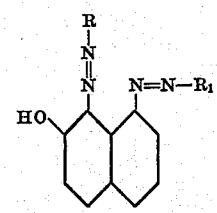

wherein R stands for aryl and R₁ stands for a member selected from the group consisting of the radical of an arylamide of a β-ketocarboxylic acid and of an arylamide of an o-hydroxycarboxylic acid which has been coupled in o-position to the hydroxy group, yielding when produced on the fiber various shades of good fastness properties.

2. Waterinsoluble azodyestuffs of the general formula:

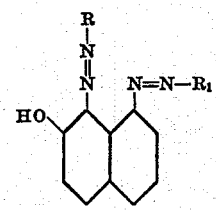

wherein R stands for a member selected from the group consisting of phenyl and alkyl-, alkoxy-, halogen- and nitro-substituted phenyl and R₁ stands for a member selected from the group consisting of the radical of an arylamide of a β-ketocarboxylic acid and of an arylamide of an o-hydroxycarboxylic acid which has been coupled in o-position to the hydroxy group, yielding when produced on the fiber various shades of good fastness properties.

3. Waterinsoluble azodyestuffs of the general formula:

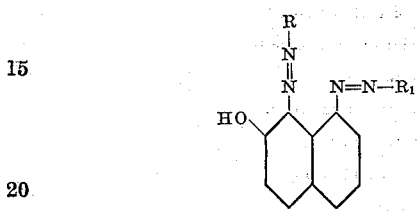

wherein R stands for a member selected from the group consisting of phenyl and alkyl-, alkoxy-, halogen- and nitro-substituted phenyl and R₁ stands for the radical of a coupled 2,3-hydroxynaphthoic acid arylamide.

4. Waterinsoluble azodyestuffs of the general formula:

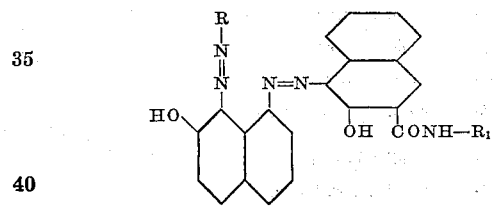

wherein R and R₁ stand for members selected from the group consisting of phenyl and alkyl-, alkoxy-, halogen- and nitro-substituted phenyl.

5. The dyestuff of the formula:

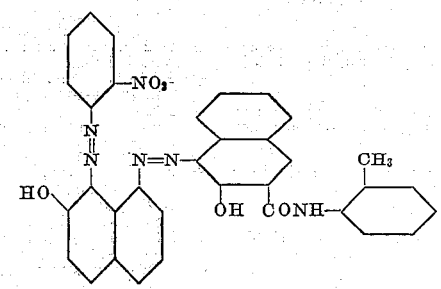

yielding when produced on the fiber yellowish blackish-brown shades of good fastness properties.

6. The dyestuff of the formula:

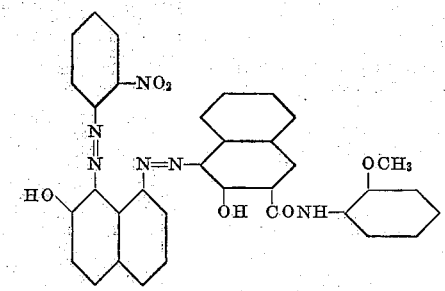

yielding when produced on the fiber yellowish blackish-brown shades of good fastness properties.

7. Fiber dyed with a dyestuff as claimed in claim 1.
8. Fiber dyed with a dyestuff as claimed in claim 2.
9. Fiber dyed with a dyestuff as claimed in claim 3.
10. Fiber dyed with a dyestuff as claimed in claim 4.
11. Fiber dyed with the dyestuff as claimed in claim 5.
12. Fiber dyed with the dyestuff as claimed in claim 6.

HEINRICH MORSCHEL.
FELIX GUND.

DISCLAIMER 2,099,272.—*Heinrich Morschel*, Leverkusen-Wiesdorf, and *Felix Gund*, Cologne-Deutz, Germany. WATER-INSOLUBLE AZODYESTUFFS AND FIBER DYED THEREWITH. Patent dated November 16, 1937. Disclaimer filed January 20, 1939, by the assignee, *General Aniline Works, Inc.*

Hereby enters this disclaimer to claims 1, 2, 3, 7, 8, and 9 of said patent.

[*Official Gazette February 14, 1939.*]